United States Patent [19]

Hofmeister et al.

[11] 4,382,049
[45] May 3, 1983

[54] FORMING A LIGHTNING SPARK ISOLATION BARRIER

[75] Inventors: Michael G. Hofmeister, Long Beach; Myron P. Amason, Stanton, both of Calif.

[73] Assignee: McDonnell Douglas Corporation, Long Beach, Calif.

[21] Appl. No.: 326,142

[22] Filed: Nov. 30, 1981

[51] Int. Cl.³ .............................................. B29C 6/00
[52] U.S. Cl. .................................. 264/40.1; 264/263; 264/268; 264/275; 264/279; 174/2; 244/1 A; 361/215; 361/218
[58] Field of Search ........... 264/261, 262, 263, 272.16, 264/40.1, 268, 275, 279; 174/30, 138 D, 2; 244/1 A, 132; 361/215, 218

[56] References Cited

U.S. PATENT DOCUMENTS 2,253,264 8/1941 Burlison .................................. 174/30
2,364,512 12/1944 Bower .................................. 264/263
2,814,668 11/1957 Hollins .
3,214,509 10/1965 Hugo .
4,123,837 11/1978 Horner .................................. 264/261

OTHER PUBLICATIONS

Lightning Protection on Advanced Fighter Aircraft, G. L. Weinstock, 1970, Lightning and Static Electricity Conference, San Diego, Calif., Dec. 9–11, 1970, pp. 195–205.

Primary Examiner—James B. Lowe
Attorney, Agent, or Firm—John P. Scholl; George W. Finch; Donald L. Royer

[57] ABSTRACT

A controlled dielectric barrier is created surrounding a fastener to isolate its sparking areas. The barrier is formed by creating a cap to define a desired cavity between the cap and the fastener and then dielectric isolation material is placed in the cavity and held in place by the cap until hardened. The cap may then be removed from the fastener as desired.

6 Claims, 9 Drawing Figures

FORMING A LIGHTNING SPARK ISOLATION BARRIER

BACKGROUND OF THE INVENTION

Modern aircraft require removable panels and inspection doors that are part of the exterior skin surface. Mechanical fasteners used to secure these and other installations that have parts of the fastener that extend to the outside surface present concern when the fasteners are located in critical fuel vapor areas. A critical fuel vapor area is an area where fuel and air exist in a stoichiometric mixture that can be ignited by a low intensity spark. Currents from a lightning spark can be conducted from a door or panel into the bolts or directly from the lightning channel into the bolt and then thru the bolt into the mechanical fastener. The many metal-to-metal surfaces of the fasteners have contact resistances which will heat up from Joule heating when the current flows. If the level of current is large enough the heating will cause hot sparks to be driven off the fastener into the critical fuel vapor area.

Mechanical fasteners in the critical fuel vapor area are typically dome nut fasteners. Dome nuts are used where fuel leaks to the outside skin must be prevented. If the dome nut fastener is relatively large the conductive metal interfaces may carry high currents without sparking. There are situations where relatively large dome nuts are not practical or possible. A relatively small dome nut fastener will not be able to transfer the current of a lightning strike without sparking at the interfaces.

In the past, attempts have been made to use fuel sealant or adhesive as a shielding or isolation material to prevent the sparks from entering the critical fuel vapor area without success. This shielding material was normally applied as a viscous substance which after a given time cured into a hardened material. In a wide bodied aircraft there are potentially a thousand or more fasteners which could be sealed to prevent sparking. Due to the large number of fasteners involved air gaps and voids were unavoidable in normal methods of application even when seemingly large amounts of sealants were applied over the sparking areas. These air gaps and voids were found to be the source of sparking in the fuel vapor area. Visual inspection of the isolation material was not adequate to detect the air gaps and voids because the location of the sparking fastener is hidden by the opaque material giving uncertainty to the thickness of the applied isolation material. Lightning simulation testing proved that air gaps and voids could not be avoided in the normal application of the isolation material.

SUMMARY OF THE INVENTION

The lightning spark barrier was designed to overcome the effects of lightning sparking by surrounding and encapsulating the sparking interfaces of the fastener with a controlled amount of dielectric barrier filler material. The dielectric filler material isolates the sparking interfaces of the fastener from a critical fuel vapor area.

In order to achieve the surrounding and encapsulating of the mechanical fastener with the controlled amount of dielectric filler material, a cap is specifically designed for each type of fastener and type of dielectric barrier material to be used. First, using electrical discharge equipment to simulate lightning, tests are made of the mechanical fastener to determine the potential sparking areas. A cap is then designed to cover the sparking areas and provide a cavity which would contain an adequate thickness of dielectric barrier material to contain both the sparks and the Joule heating pressure. Due to the complex nature of the lightning spark phenomenon, theoretical prediction of the exact thickness of the dielectric barrier material is difficult. Lightning simulation tests should normally be made on the encapsulated fastener to verify the adequacy of the thickness of dielectic barrier material and the design of the cap.

The cap is usually designed so that it automatically aligns itself over the dome nut to assure a controlled cavity for the dielectric barrier filler material. In the instance of dome-type fasteners, the dome is normally used to align the cap, however, other features or protrusions of the fastener such as the shoulders or crimp can also be used to further align the cap. The cap provides a means to control the application of the dielectric filler material and insure that it is sufficiently thick, in the correct position and does not have voids or air gaps. The cap need not remain in place after the dielectric filler material has been emplaced and has hardened. However, in the preferred embodiment the cap is made of dielectric material as it will add additional physical protection for the barrier material as well as provide isolation.

Several methods can be used to ensure that the dielectric filler material is free of voids and gaps. First, the cap may be filled with dielectric filler material in an viscous uncured state and placed over the dome fastener. The cap is then forced onto the fastener and in the correct orientation the excess filler material squeezed out is removed and the remaining material allowed to cure to a hardened state. In a second method, the cap is placed over the fastener in the proper orientation and the dielectric filler material is injected into the cavity between the cap and the fastener through holes in the cap that ensure proper filling of the cavity. In both instances, when the dielectric filler material has cured to a hardened state the cap may or may not be removed depending upon the design for the spark barrier.

DESCRIPTION OF THE PREFERRED EMBODIMENT

Figure 1:
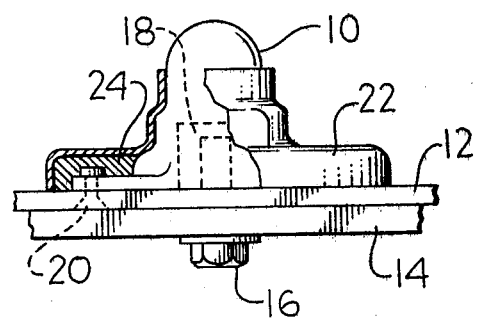
FIG. 1 is a side elevation of a mechanical fastener used to hold two surfaces together. The fastener is located on aircraft inner surface in a critical fuel vapor area.

In FIG. 1 a typical dome mechanical fastener 10 is shown holding two skin surfaces 12 and 14 together by a bolt 16 and nut 18 arangement. The fastener 10 is attached to the surface 12 by rivets 20. The location of fastener 10 is on the inner surface of the exterior skin of the aircraft and is located in a critical fuel vapor area. The fastener 10 is partially surrounded by a cap 22. The dimensions of the cap 22 have previously been determined based upon tests defining of the lightning spark potential and Joule heating of the particular fastener 10 as well as the dielectric isolation material to be used. The cap 22 was first filled with the dielectric isolation material in an uncured viscous or plastic form and the cap 22 was placed over fastener 10 so that the dielectric isloation material 24 completely filled the cavity between the cap 22 and the mechanical fastener 10. The cap 22 is made of plastic or other dielectric material and forms part of the sparking barrier. If the cap 22 was not made of dielectric material it must be removed once the dielectric isolation material 24 has solidified in place surrounding the fastener 10.

Figure 3:
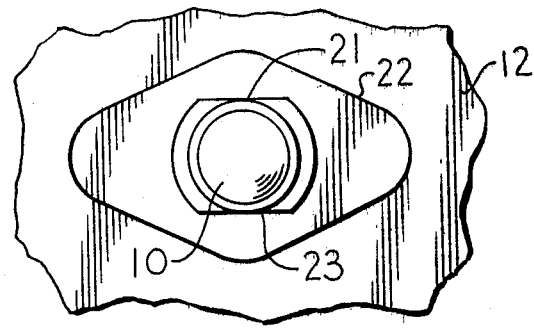
FIG. 3 is a plan view of the fastener of FIGS. 1 and 2 before placement of the cap and barrier material.

In FIG. 1 cap 22 is correctly oriented over the mechanical fastener by the flat sides 21 and 23 (FIG. 3) of the cap 22 which engage the sides of the fastener. The isolation material 24 has been squeezed into the cavity between the cap 22 and the fastener 10 and eventually out around the base of the cap indicating the cavity under the cap has been completely filled by the dielectric isolation material 24.

In operation a fastener 10 is first examined and tested to determine the areas of sparking and Joule heating. A dielectric isolation material 24 is then selected with known physical properties. Based upon this information, a cap 22 is designed for the fastener such that the cap will surround the sparking areas and define a cavity between the cap and the sparking areas to be filled with the dielectric isolation material. The cap 22 is then filled with the isolation material 24 in viscous form and forced down over the fastener 10 to hold a defined amount of dielectric isolation material adjacent to the critical sparking areas of the fastener 10 until the isolation material 24 has cured.

Figure 2:
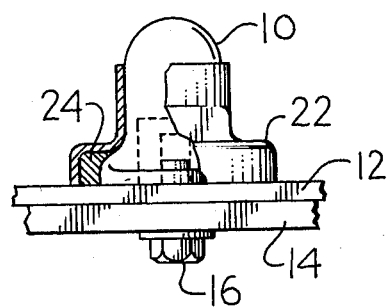
FIG. 2 is an end view of the fastener of FIG. 1.
Figure 4:
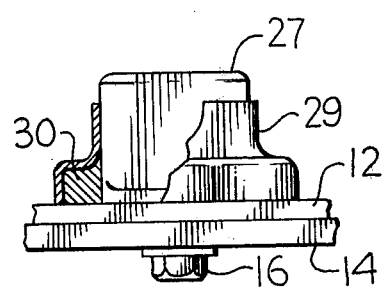
FIG. 4 is a side elevation view of a square shaped dome fastener.
Figure 5:
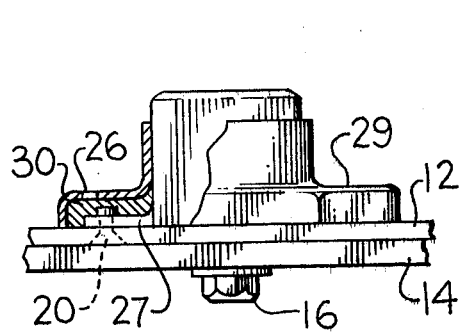
FIG. 5 is an end view of the fastener of FIG. 4.
Figure 6:
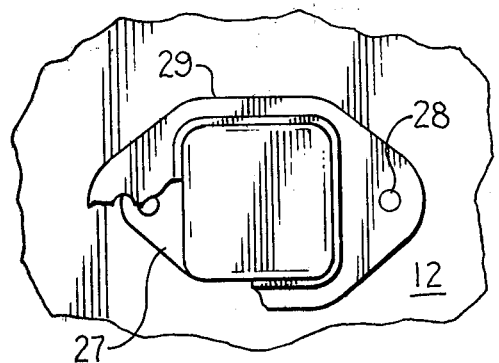
FIG. 6 is a plan view of the fastener of FIGS. 4 and 5.

In FIGS. 4, 5, and 6 a square fastener 27 is depicted. The square shaped fastener 27 has been affixed by rivets 20 to the inner surface 12 of the aircraft surface. A bolt 16 engages fastener 27 thru surfaces 12 and 14 and holds them together similar to the installation in FIGS. 1, 2 and 3. In the case of the fastener of FIGS. 4, 5 and 6 the cap 29 is orientated by the square shape of the dome. The cap 29 is forced down over the dome till it engages surface 12. The isolation material in a viscous or fluid form is injected through hole 26 (FIG. 5) in the cap 29 till it extrudes along the bottom and top edges of the cap. Additional filler material is then injected thru hole 28 (FIG. 6) on the opposite side of the cap 27 until it extrudes around the rest of the edges of the cap indicating that the cavity between the cap 29 and the square dome fastener 27 has been completely filled with isolation material 30.

Figure 7:
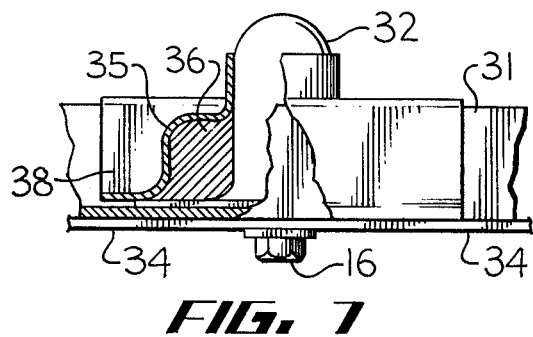
FIG. 7 is a side elevation of a dome fastener located in a gang channel.
Figure 8:
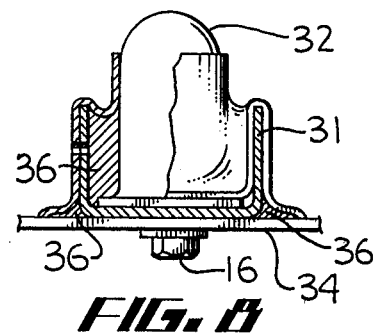
FIG. 8 is an end view of the fastener of FIG. 7.
Figure 9:
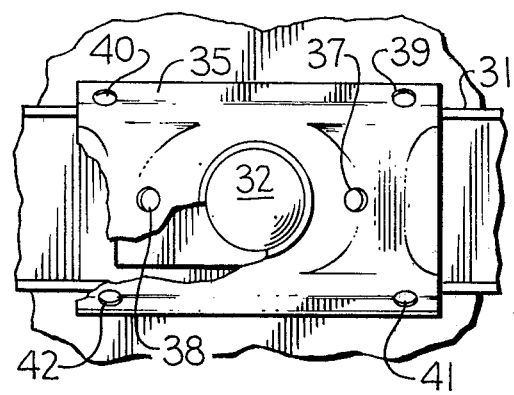
FIG. 9 is a plan view of the fastener of FIGS. 7 and 8.

In FIGS. 7, 8 and 9 a gang channel 31 is shown enclosing a series of nut plates or dome fasteners 32. A bolt 16 passes thru and holds the gang channel 31 to surface 34. A sealant cap 35 has been placed over the fastener 32 to defined a cavity between the cap 35, and the channel 31 to be filled with dielectric isolation material 36.

The cap 35 is oriented by the dome top of the fastener 32 and by the gang channel 31. Once the cap 35 is in place, dielectric isolation material 36 in a viscous or fluid state is injected thru holes 37, 38, 39, 40, 41, and 42 in the cap 35 to isolate critical sparking areas of this installation. The dielectric isolation material 36 is then allowed to cure to a hardened state and cap 35 may be removed as desired depending upon the composition of the cap and the need for protection of the dielectric isolation material.

While certain exemplary embodiments of this invention have been described above and shown in the accompanying drawings, it is to be understood that such embodiments are merely illustrative of, and not restrictive on, the broad invention to the specific desire to be limited in my invention to the specific constructions or arrangements shown and described, since various other obvious modifications may occur to persons having ordinary skill in the art.

What is claimed is:

1. A method of making a lightning spark isolation barrier for surrounding a fastener comprising the steps of:
    determining the areas of sparking and Joule heating of the fastener;
    evaluating the isolation potential of the dielectric material to be used;
    defining a cavity surrounding the fastener to be isolated with the dielectric material;
    creating a cap to enclose the cavity surrounding the fastener, and
    using the cap to hold a defined amount of dielectric isolation material in viscous plastic form surrounding the critical sparking and Joule heating areas of the fastener until the isolation material has cured to a hardened state.

2. The method of claim 1 wherein the determination of the sparking and Joule heating areas of the fastener are defined by simulated lightning sparking tests.

3. The method of claim 2 wherein the cap is aligned on the fastener by engaging protrusions on the fastener.

4. The method of claim 3 wherein the viscous plastic dielectric isolation material is first placed in the cap and then the cap is forced over the fastener to emplace the dielectric isolation material.

5. The method of claim 3 wherein the cap is first emplaced on the fastener and then the dielectric isolation material in viscous form is injected into the cavity between the cap and the fastener to isolate the critical sparking and Joule heating areas.

6. The method of claims 3 or 4 wherein the cap is removed following the curing of the isolation material to a hardened state.

* * * * *